United States Patent [19]

Pivonka

[11] Patent Number: 4,666,726
[45] Date of Patent: May 19, 1987

[54] DOUGH MOULDING AND APPARATUS FOR DOUGH MOULDING WITH AIR CUSHION CHUTE

[75] Inventor: Joseph K. Pivonka, Norwick, England

[73] Assignee: Tweedy of Burnley Limited, Lancashire, England

[21] Appl. No.: 753,442

[22] Filed: Jul. 10, 1985

[51] Int. Cl.⁴ .............................................. A21C 1/08
[52] U.S. Cl. ................... 426/502; 198/493; 406/77; 406/88; 406/89; 425/337; 425/363; 425/383
[58] Field of Search ............ 406/70, 77, 75, 78, 406/86, 88, 89, 93; 426/502; 425/335, 337, 383, 363; 198/493

[56] References Cited

U.S. PATENT DOCUMENTS

| | | |
|---|---|---|
| 1,763,620 | 6/1930 | Wolfarth et al. |
| 2,479,864 | 8/1949 | Rhodes ................................. 426/502 |
| 2,677,334 | 5/1954 | Hansen . |
| 2,687,698 | 8/1954 | Duffy . |
| 2,691,351 | 10/1954 | Turner . |
| 2,746,401 | 5/1956 | Archer . |
| 3,304,619 | 2/1967 | Futer ..................................... 406/88 |
| 3,332,781 | 7/1967 | Benson et al. ....................... 426/502 |
| 3,603,646 | 9/1971 | Leoff ..................................... 406/89 |
| 3,999,926 | 12/1976 | Victor . |
| 4,493,548 | 1/1985 | Ateya ................................... 406/88 |

FOREIGN PATENT DOCUMENTS 3131469 5/1982 Fed. Rep. of Germany .
1090452 11/1967 United Kingdom .
1466314 5/1973 United Kingdom .

*Primary Examiner*—Willard E. Hoag
*Attorney, Agent, or Firm*—Quaintance, Murphy & Presta

[57] ABSTRACT

The invention relates to the moulding of dough pieces, for instance in the production of bread. In a dough moulding machine, there are pairs of sheeting rollers, which roll out the piece of dough into a sheet. In the method of the present invention the dough piece is caused to pass over a fluidized bed in its approach to a pair of sheeting rollers. Further, the dough piece may pass over a fluidized bed as it is transferred from one pair of sheeting rollers to a following pair of sheeting rollers.

The invention also includes an arrangement for replacing the usual feed hopper of a dough panner by a conveyor, a fluidized bed and lateral locating devices for the dough piece.

17 Claims, 2 Drawing Figures

DOUGH MOULDING AND APPARATUS FOR DOUGH MOULDING WITH AIR CUSHION CHUTE

BACKGROUND OF THE INVENTION

In the manufacture of baked farinaceous products such as bread, it is usual to mould the divided pieces of dough, and in most cases, the dough pieces are then fed into individual baking tins or pans.

A typical moulder/panner as used in a bakery essentially comprises: a moulding head, wherein divided pieces of dough are received and passed through the nip of at least one pair of sheeting rollers so that each dough piece is rolled into sheet form; a coiler wherein each sheet is coiled upon itself into a roll; and a panner where each dough roll is fed into a bread pan before proceeding to the oven.

A well known moulder has three pairs of sheeting rollers and the gap between the rollers of each pair progressively reduces in thickness, so that the dough passing through the rollers is squeezed in three stages, the dough mass being formed into a sheet at the first pair of rollers and then reduced in thickness (and increased in area) at each of the second and third pairs of rollers.

The present invention relates to a dough moulding method, and to apparatus for carrying out the method. Although it is expected that the invention will be applied to dough moulder/panners of the general type to which reference has been made, it is to be understood that it is applicable to any kind of dough moulder in which the dough is caused to pass through one or more pairs of sheeting rollers.

One of the problems associated with dough moulders is that of correct presentation of the divided dough pieces to the sheeting rollers. Moulder/panners usually have a hopper at the input end, and the pieces of dough, which have been roughly shaped into circular form in a previous process, fall into the hopper from a conveyor, and the hopper itself then guides the dough pieces into the nip of the, or the first pair of, nip rollers. Sometimes, a dough piece will be deflected as it falls througgh the hopper and will lie at an angle to the longitudinal axes of the sheeting rollers. When this happens, the sheeting rollers roll the dough into a sheet which is mis-shapen, that is to say, not circular, and as a result, the coiled dough piece presented to the pan is not of the correct shape. It will be appreciated, that one of the objects of dough moulding is that of ensuring that the dough pieces which are fed into the bread pans are of consistent size and shape.

A related problem is that the hopper feed device may not present the dough pieces centrally of the width of the sheeting rollers. If the panner end of the machine is equipped with folding apparatus (such as apparatus adapted to fold the elongate dough piece into a W-formation) that apparatus cannot function properly, if the coiled dough pieces issuing from the machine are not centralised across the width of the machine.

Another problem arises because it is necessary to provide guide plates to convey the dough sheet from one pair of sheeting rollers to the next. The pairs of rollers are usually arranged one above the other, so that the dough sheet falls by gravity from one pair of rollers to the next, but the guide plate is inclined so that it lends support to the dough sheet to prevent collapse of the sheet. There is a tendency for the leading end of a dough sheet to stick to a guide plate, or at least to be excessively retarded by the guide plate, so that the sheet is not properly presented to the next pair of sheeting rollers. This results in the formation of a poor grain or cell structure in the baked product.

Both these problems are accentuated, with modern soft doughs, which contain relatively high quantities of liquids (i.e. water and liqud fats and glucose). This is because the soft tacky nature of the dough tends to cause any part of the dough piece which engages with a surface of the machine to be retarded, so that the dough piece becomes mis-shaped each time it strikes a surface as in falling through a hopper, or sliding over a guide plate. The invention aims at ensuring that the divided dough pieces are presented properly to and pass easily through the sheeting rollers of a dough moulder.

FEATURES OF THE INVENTION

According to one aspect of this invention in the moulding of dough pieces, each dough piece is caused to pass first over a fluidised bed (air cushion) and immediately afterwards is caused to pass through the nip of a pair of sheeting rollers. A fluidised bed (air cushion) is a plate having a number of perforations through which streams of fluid are caused to issue, the arrangement being such that when a dough piece falls on to the plate, the escaping streams of fluid under the dough piece unite and form a fluid film between the plate and the dough piece. In practice, a fluidised bed will virtually prevent contact between the dough and the plate, so that the dough piece is effectively floating on the film of fluid. There may be occasional and localised contact between the dough piece and the plate, but the overall effect is that of the dough floating on a film of fluid without contacting the plate itself. The fluid used for the film may be a liquid, which would have no deleterious effect on the dough sheet, such as water or certain oils, but it is preferred to us a gaseous fluid, and in the preferred method, the fluid is air.

It will be appreciated, that because of the floatation, the soft and tacky nature of the dough makes no difference to its movement, and it has been found possible by the floatation method to ensure proper presentation of the dough pieces to the sheeting rollers.

In one arrangement, each dough piece is caused to pass through a first pair of sheeting rollers, then over a fluidised bed and immediately after passage over the fluidised bed through a second pair of sheeting rollers. The fluidised bed therefore replaces or modifies the guide plate between one pair of sheeting rollers and the next pair.

According to a preferred method, each dough piece is fed from a conveyor directly on to the fluidised bed which is inclined, so as to guide the dough piece into a pair of sheeting rollers. This method obviates the customary hopper feed, and has been found to give more consistent properly orientated presentation of the dough to the sheeting rollers than the hopper feed.

It is further preferred that the dough piece in travelling over a fluidised bed on to which it has been fed by the conveyor, is engaged by a pair of lateral locating devices which control the lateral position of the dough piece as it is moving towards the pair of sheeting rollers.

According to another aspect of the invention a dough moulder having at least one pair of sheeting rollers is provided with a fluidised bed located in the path of a dough piece travelling towards said at least one pair of sheeting rollers, said fluidised bed being adapted to direct a dough piece passing over it into the nip between the rollers of said at least one pair of sheeting rollers. The bed may in fact terminate very close to the periphery of the lower of said at least one pair of sheeting rollers, so that a dough piece moving off said fluidised bed passes directly on to the surface of said lower sheeting roller at a position immediately in front of the nip of said pair of sheeting rollers.

According to a preferred feature of the invention the fluidised bed is located in front of a first pair of sheeting rollers and a conveyor forming part of the moulder is arranged to drop dough pieces directly on to said fluidised bed. The conveyor may be driven through gearing from the moulder driving mechanism so that it is adapted to move in synchronism with the moulder, or it may be independently driven.

In addition to a fluidised bed located immediately in front of the first pair of sheeting rollers, there may be a similar fluidised bed located between a first pair of sheeting rollers and a following pair of sheeting rollers, and adapted to guide a dough sheet from the first pair of rollers towards the nip of the succeeding pair of rollers. Indeed in the preferred arrangement, there are three pairs of sheeting rollers with three fluidised beds, one bed immediately before the first pair of rollers; one bed between the first and second pairs of rollers and one bed between the second and third pairs of rollers. With this arrangement, the dough piece is guided through the moulder head entirely on the rollers and fluidised beds.

It is further preferred to provide a pair of lateral location devices on the moulder in locations such that they are adapted to "engage" with the dough pieces travelling over the fluidised bed. The lateral location devices preferably take the forms of rollers rotating about axes substantially perpendicular to the surface of the fluidised bed.

According to yet another preferred feature of the invention the or each fluidised bed is inclined downwardly towards the sheeting rollers.

Preferably the guide plate is foraminous, and means are provided for blowing a fluid through the guide plate and out through its operative surface. For example, the guide plate may be formed with a multiplicity of holes, there being a plenum chamber on the non-operative side of the guide plate and a pump for blowing fluid into the plenum chamber and out through the said holes.

SPECIFIC EMBODIMENT

The construction of a dough moulder for use in a bakery, and its method of use, both in accordance with the invention, will now be described by way of example only, with reference to the accompanying drawings, in which.

In the specific embodiment, the invention is applied to a conventional dough moulder/panner, as used in a bakery, for the production of loaves on a commercial scale. Dough from the dough mixer (not shown) is passed through a dough divider (not shown) which divides the mass of dough coming from the mixer, into separate small pieces each of a required weight for the production of the finished product—for example a 2 lb. loaf. The divided dough pieces fed to the moulder/panner are generally circular in shape, but at that stage, they have not been subjected to sheeting and rolling.

Figure 1:
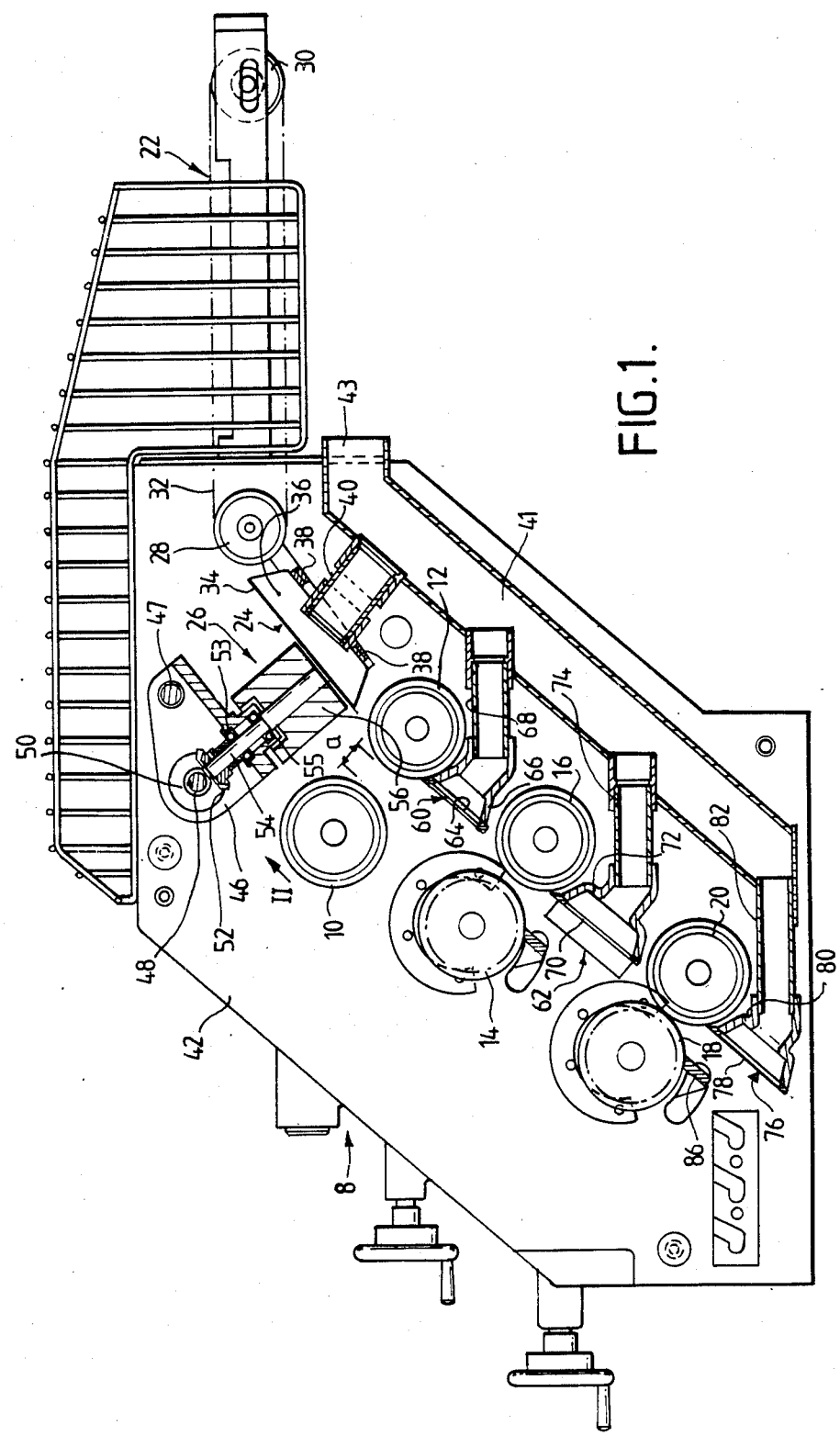
FIG. 1 is a vertical section through the moulder.

The dough moulder has a moulding or sheeting head, indicated generally at 8, having side frames 42 and 44, and within this sheeting head there are three pairs of sheeting rollers: 10,12; 14,16 and 18,20. The dough piece passing through the sheeting head passes first through the nip of the sheeting rollers 10,12, then through the nip of the sheeting rollers 14 and 16 and finally through the nip of the sheeting rollers 18 and 20. It will be observed from FIG. 1, that the roller arrangement is such that the path of the dough piece through the three pairs of rollers is generally inclined downwardly, and in this specific embodiment, the path is inclined at approximately 45° to the horizontal.

The first pair of sheeting rollers 10 and 12 are spaced apart by an appreciable distance a, and when the dough piece enters the nip between these rollers 10 and 12, it is gently compressed into a sheet of appreciable thickness, as determined by the spacing between the rollers. The sheet of dough emerging from the pair of rollers 10 and 12 passes to the nip between the second pair of sheeting rollers 14 and 16, set closer to each other than the first pair of rollers, so that as the dough sheet passes between them, it is squeezed, to reduce its thickness, thereby at the same time increasing its area. The dough sheet emerging from the nip of the second pair of rollers 14 and 16 then passes through the nip of the third pair of rollers 18 and 20, which are set quite close to each other, so that when the sheet of dough passes between them, it is further squeezed to the desired finished thickness, and at the same time of course, the area of the dough sheet increases. This is a conventional roller arrangement in a moulder/panner sheeting head.

In the conventional machine, the divided dough pieces from the dough divider are fed into a hopper, which directs the dough pieces into the nip of the first pair of sheeting rollers 10 and 12. In the present arrangement however, the hopper is replaced by a short horizontal conveyor 22, a fluidised bed 24 and a lateral location arrangement 26.

The conveyor 22 is mounted on the frame of the dough moulder, and simply comprises a pair of driving rollers 28 and 30, and a fabric belt 32, which may for example be made of similar material to the belts used for the coiler part of the moulder/panner. It will be noted that the top run of the belt 32 is relatively short, and indeed the entire conveyor 22 is designed so as to be able to accommodate one or at the most two or three dough pieces from the dough divider. The dough pieces fall on to the top run of the belt 32 from the dough divider, and because there are no constricting surfaces, the dough piece lies flat on the conveyor, and is unlikely to become mis-shapen whilst it is being carried forward by the conveyor.

The fluidised bed 24 has a top plate 34 formed with a large number of small bore holes. In a typical arrangement, the holes may each be 0.062 inches diameter, and evenly spaced from each other in ranks and files over the area of the plate 34. The whole effective surface area of the plate—that is to say the part which is likely to be contacted by the dough sheet—is formed with the small holes. On the underside of the plate 34, there is a plenum chamber 36, secured to bars 38 forming part of the static framework of the sheeting head and extending between the side frames 42 and 44, there being a rubber or rubber-like seal all round the periphery of the plenum chamber, engaging with the undersurface of the guide plate 34. A short pipe 40 leads from the plenum chamber 36 to a manifold 41 which is located below the three sets of sheeting rollers.

An inlet 43 is provided at the upper end of the manifold 41, and a fan type pump (not shown) is connected via a suitable conduit to the inlet 43. The fan is adapted to blow air under pressure (above atmospheric pressure) into the manifold 41, and from there, the air flows into the plenum chamber 36 and out through the multiplicity of small bore holes in the guide plate 34. This provides the air for the fluidised bed 24 which is located between the conveyor 22 and the first pair of sheeting rollers 10 and 12.

The guide plate 34 extends from a position very close to the part of the conveyor belt 32 which passes around the roller 28 at the exit end of the conveyor, to a position very close to the surface of the bottom sheeting roller 12, immediately in front of the nip between the rollers 10 and 12 is inclined at an angle of about 45° to the vertical. As a dough piece slides off the front end of the conveyor 22, it falls on to the surface of the guide plate 34, and then slides down that surface, to engage on the surface of the bottom sheeting roller 12. However, when the pump is operating to blow streams of air out through the holes formed in the guide plate 34, those streams of air unite under the dough piece, to form a continuous film of air between the dough piece and the guide plate 34. Hence, the dough piece does not actually contact the guide plate, apart from any incidental and localised contact which might accidentally occur, but instead, the dough piece floats on the film of air. In this way, the dough piece is transferred very readily to the nip of the sheeting rollers 10 and 12, and since there is no physical engagement between the dough piece and the guide plate 34, there is no retardation of any part of the dough piece even though the dough might be relatively tacky.

The transfer of the dough from the conveyor 22 to the sheeting rollers is controlled by a combination of the angle of inclination of the guide plate 34 to the vertical and the rate of fluid flow out through the operative surface of the guide plate. The greater the angle of inclination of the guide plate to the vertical, the greater will be the retardational force applied to the dough sheet by the guide plate, and the greater the rate of flow of fluid out through the operative surface of the guide plate (up to a limit related to the angle of inclination of the guide plate) the lesser the retardational force applied to the dough. Optimum working conditions for a given dough constitution can be achieved by correct balance of the angle of inclination of the guide plate and the rate of flow of the fluid. The angle of inclination is fixed by the construction of the machine and therefore optimisation is arrived at by correct control over the rate of fluid flow. In a specific instance, where the angle of inclination of the guide plate is approximately 45° to the vertical and the dough moulder is being used to produce sheets of dough for conventional 2 lb. loaves as commonly supplied in the United Kingdom, and using air as the fluid, a rate of flow of 90 cubic feet per minute has been found to be satisfactory.

It is desirable to centralise the dough piece across the width of the machine, particularly if the panner end of the machine is equipped with knives and folders, for the purpose of folding the coiled dough piece emerging from the moulder. The lateral location devices 26 perform this function.

Figure 2:
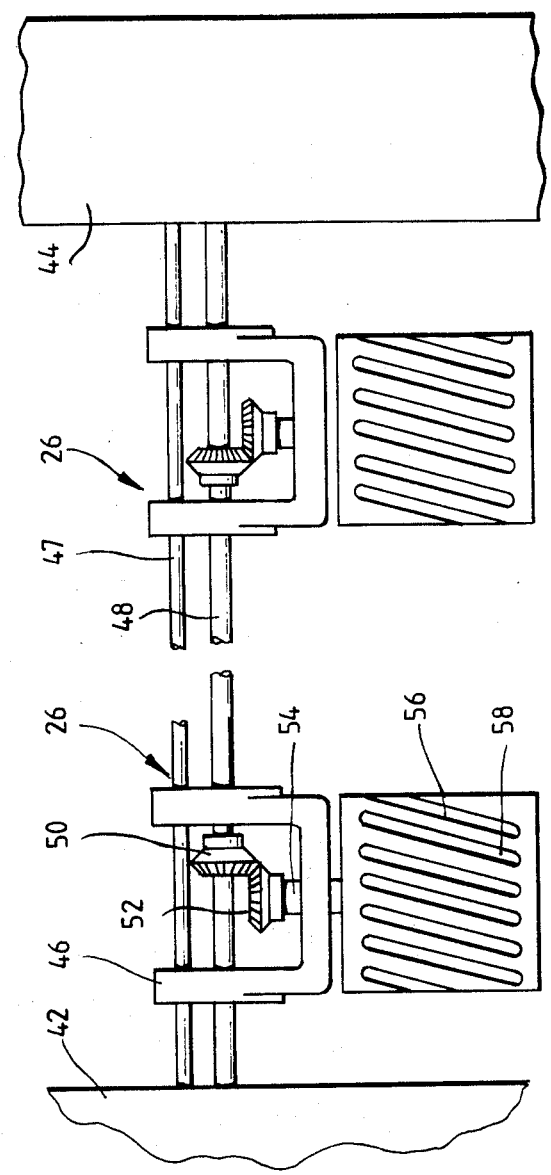
FIG. 2 is a detail view looking in the direction of arrow II in FIG. 1.

As shown more clearly in FIG. 2, there are two such lateral location devices 26, each of which is adjustable laterally between the side frame members 42 and 44 of the sheeting head. Each lateral location device has a generally U-shaped bracket 46, which is carried by a rod 47, which extends across the width of the machine between the side frames. This rod 47 is journalled in bearings in the side frames and has a lefthand screw-threaded portion which engages in a screw-threaded bore in one of the brackets 46 and a righthand screw-threaded portion which engages in a screw-threaded bore in the other bracket 46. At one side of the machine a handwheel (not shown) is keyed on to the rod 47, and by turning that handwheel and the rod, the brackets 46 are caused to move towards or away from each other to adjust the spacing between them, but they always remain equi-distant from the longitudinal centre line of the machine.

A driving shaft 48 also extends across the width of the machine and passes through the two U-shaped brackets 46. The shaft 48 is driven by gearing (not shown) in one of the side frames, from the driving mechanism of the sheeting rollers. With each U-shaped bracket 46, there is a spiral bevel pinion 50, keyed on to the driving shaft 48, and this pinion 50 engages with a spiral bevel wheel 52 keyed on to a roller shaft 54, which passes through and is journalled in a pair of ball bearings 53 and 55 in the lower horizontal part of the U-shaped bracket 46. A lateral location roller 56 is keyed on to the roller shaft 54, and its periphery may be fluted as indicated in FIG. 2. Hence, when the machine is in operation, the two lateral location rollers 56 are rotated, and the arrangement is such that they rotate in opposite directions, whereby the parts of these rollers on the insides (i.e. the parts facing each other) both move in the same direction, so that a dough piece engaging with the rollers 56 is stroked by those rollers in a forward direction, that is to say downwardly across the guide plate 34, towards the nip of the first pair of sheeting rollers 10 and 12. It will be observed from FIG. 1, that the brackets 46 are held in an inclined position, so that the locating rollers rotate about axes which are substantially perpendicular to the top surface of the guide plate 34. The bottom edges of the rollers 56 are quite close to the top surface of the plate 34.

In use, the brackets 46 are adjusted, so that the lateral spacing between the rollers 56 is approximately the same as the diameter of a dough piece coming from the conveyor 22. Hence, if a dough piece is displaced to one side of the desired centralised position, when it arrives on the fluidised bed 24, it will engage with one of the rollers 56, which by virtue of its rotation will urge that dough piece back into the centralised position. It has been found, that as the dough piece is floating quite freely over the surface of the guide plate 34, little distortion of the shape takes place as a result of any contact with the roller 56.

A further fluidised bed arrangement 60 is provided between the first pair of sheeting rollers 10 and 12, and the second pair of sheeting rollers 14 and 16. This fluidised bed is constructed in similar manner to the fluidised bed 24, and it need not therefore be described in great detail. The purpose of the fluidised bed 60 is to convey the sheet of dough emerging from the sheeting rollers 10 and 12, to the second pair of sheeting rollers 14 and 16. The fluidised bed arrangement 60 comprises an inclined guide plate 64 formed with a multiplicity of small bore holes and a plenum chamber 66 secured and sealed to the underside of the guide plate 64, with a short pipe 68 leading from the plenum chamber 64 to the manifold 41. When the fan is operated, some of the air forced into the manifold will flow through the pipe 68 into the plenum chamber 66 and then out through the surface of the guide plate 64. This creates a second fluidised bed on the guide plate leading from the first pair of sheeting rollers 10 and 12 to the second pair of sheeting rollers 14 and 16. The plate 64 is adapted to guide a dough piece on to the lower roller 16 in the same way as the guide plate 34 guides the dough piece on to the roller 12.

A third fluidised bed arrangement 62 is provided between the sheeting rollers 14 and 16 and the third pair of sheeting rollers 18 and 20, which again is similar to the fluidised bed 24, and comprises a guide plate 70; plenum chamber 72 and a short pipe 74 leading into the manifold 41.

Finally, there is a fourth fluidised bed arrangement 76, comprising an inclined guide plate 78, a plenum chamber 80, and a short pipe 82 leading from the plenum chamber into the bottom end of the manifold 41. The top edge of the guide plate 78 tapers to a point in cross-section, and provides a knife edge engaging with or just clear of the surface of the bottom sheeting roller 20. Hence, the guide plate 78 is adapted to scrape the sheet of dough emerging from the bottom pair of sheeting rollers 18 and 20 away from the bottom roller 20, should it be adhering to that roller. A further scraper blade 84 carried by a block 86 extending across the width of the machine, engages with or is set just clear of the undersurface of the top sheeting roller 18, so that it is adapted to detach the dough piece from the roller 18 should it be adhering thereto.

Therefore, the dough piece will always be directed on to the fluidised bed 76, from which it is guided on to a conveyor (not shown) forming part of the coiling and tightening mechanism of the moulder/panner.

During operation of the machine, the sheeting rollers are rotated continuously, and the fan is also operated to blow air under pressure into the manifold 43. Hence, air is always escaping through the surfaces of the guide plates 34, 64, 70 and 78. Divided dough pieces from the dough divider arrive one at a time on the top run of the conveyor 22, and are delivered from the outlet end of that conveyor on to the fluidised bed 24. Each dough piece floats over the surface of the guide plate 34, and is centralised by the rollers 56 during its passage over the fluidised bed 24. The dough piece then passes through the first pair of sheeting rollers 10 and 12, after which it is guided over the fluidised bed 60 into the nip of the second pair of sheeting rollers 14 and 16. On emerging from the sheeting rollers 14 and 16, the dough piece is guided by the fluidised bed 62 into the nip of the third pair of sheeting rollers 18 and 20, and on emerging from the nip of those rollers, it is guided by the fluidised bed 76 on the conveyor of the coiling and tightening mechanism.

It will be appreciated therefore, that the dough piece is always floating when it is being delivered into the nip of a pair of sheeting rollers, and this is of assistance in ensuring that the dough piece does not become misshapen by retardation resulting from engagement with guiding parts of the machine.

It will be understood, that various modifications may be made to the specific arrangement described with reference to the drawings, without parting from the scope of the invention. For instance, the locating rollers 56 may be replaced by stationary guide plates inclined inwardly and downwardly, and these guide plates may themselves be formed as fluidised beds. Also, it will be appreciated that the invention could be applied to sheeting roller arrangements in which there are only two pairs of sheeting rollers.

I claim:

1. A method of moulding dough pieces, in which each piece is caused to travel on an air cushion over a guide plate, and immediately afterwards is cause to pass through the nip of a pair of sheeting rollers the air cusion being available over the whole effective surface area of said guide plate.

2. A method of moulding dough pieces as claimed in claim 1, wherein each dough piece is fed from a conveyor directly on to said air cushion over said guide plate which is included so as to guide the dough piece into the nip of said pair of sheeting rollers.

3. A method of moulding dough pieces, wherein each dough piece is caused to pass through a first pair of sheeting rollers then to travel on said air cushion over said guide plate and immediately after passage over said guide plate through a second pair of sheeting rollers.

4. A method of moulding dough pieces as claimed in claim 3, wherein each dough piece is fed from a conveyor directly on to said air cushion over said guide plate which is inclined so as to guide the dough piece into the nip of said pair of sheeting rollers.

5. A method of moulding dough pieces as claimed in claim 4 in which the dough piece in travelling over said air cushion on to which it has been fed by the conveyor is engaged by a pair of lateral locating devices which control the lateral position of the dough pieces as it is moving towards the pair of sheeting rollers.

6. A dough moulder having at least one pair of sheeting rollers and provided with a guide plate located in the path of a dough piece travelling towards said at least one pair of sheeting rollers, said guide plate being adapted to direct a dough piece passing over it into the nip between the rollers of said at least one pair of sheeting rollers, and said guide plate being further adapted to provide an air cushion under a dough piece travelling over it at any position over the whole of the effective surface area of the guide plate.

7. The dough moulder according to claim 6, wherein said guide plate is located in front of a first pair of sheeting rollers and a conveyor forming part of the moulder is arranged to drop dough pieces directly on to an air cushion on said guide plate.

8. A dough moulder according to claim 7, wherein said guide plate is provided between a first pair of sheeting rollers and a following pair of sheeting rollers.

9. A dough moulder according to claim 7, wherein there are three pairs of sheeting rollers and three guide plates, one guide plate immediately before the first pair of rollers; one guide plate between the first and second pair of rollers and one guide plate between the second and third pairs of rollers each of said three guide plates being adapted to provide an air cushion under a dough piece travelling over it at any position over the whole of the effective surface area of that guide plate.

10. A dough moulder according to claim 7, wherein said guide plate comprises a foraminous plate and means for blowing a fluid through said foraminous plate and out through its operative surface.

11. A dough moulder according to claim 10, wherein said plate is formed with a multiplicity of holes, there being a plenum chamber on the non-operative side of said plate and a pump for blowing fluid into said plenum chamber and out through the said holes.

12. A dough moulder according to claim 6, wherein said guide plates terminates very close to the periphery of the lower of said at least one pair of sheeting rollers, the arrangement providing that a dough piece moving off said guide plate passes directly on to the surface of said lower sheeting roller at a position immediately in front of the nip of said pair of sheeting rollers.

13. A dough moulder according to claim 12, wherein said guide plate is located in front of a first pair of sheeting rollers and a conveyor forming part of the moulder is arranged to drop dough pieces on to an air cushion on said guide plate.

14. A dough moulder according to claim 12, wherein said guide plate is provided between a first pair of sheeting rollers and a following pair of sheeting rollers.

15. A method of moulding dough pieces, in which each piece is dropped from a conveyor directly onto an air cushion over a guide plate and is caused to travel thereover, and immediately afterwards is caused to pass through the nip of a pair of sheeting rollers, the air cushion being available over the whole effective surface area of the guide plate and, during the travel of a dough piece over the air cushion, engaging the dough piece by a pair of lateral locating devices which control the lateral position of the dough piece as it is moving towards the pair of sheeting rollers.

16. A dough moulder having at least one pair of sheeting rollers and provided with a guide plate located in the path of a dough piece travelling towards said at least one pair of sheeting rollers, said guide plate being adapted to direct a dough piece passing over it into the nip between the rollers of said at least one pair of sheeting rollers, said guide plate being further adapted to provide an air cushion under a dough piece travelling over it at any position over the whole of the effective surface area of the guide plate, there further being a pair of lateral location devices on the moulder in locations such that they are adapted to "engage" with the dough pieces travelling over said guide plate whereby said lateral location devices control the lateral position of the dough piece as it is moving towards said at least one pair of sheeting rollers.

17. A dough moulder according to claim 11, wherein said lateral location devices take the form of rollers rotating about axes substantially perpendicular to the surface of said guide plate.

* * * * *

UNITED STATES PATENT AND TRADEMARK OFFICE
CERTIFICATE OF CORRECTION

PATENT NO. : 4,666,726

DATED : May 19, 1987

INVENTOR(S) : Joseph K. PIVONKA

It is certified that error appears in the above-identified patent and that said Letters Patent is hereby corrected as shown below:

Claim 1, line 3, delete "cause" and insert --caused--.

Claim 8, line 1, delete "7" and insert --6--.

Claim 9, line 1, delete "7" and insert --6--.

Claim 10, line 1, delete "7" and insert --6--.

Claim 17, line 1, delete "11" and insert --16--.

Signed and Sealed this

Eleventh Day of August, 1987

Attest:

DONALD J. QUIGG

Attesting Officer

Commissioner of Patents and Trademarks